(12) United States Patent
Ballocchi et al.

(10) Patent No.: US 11,149,770 B2
(45) Date of Patent: Oct. 19, 2021

(54) LOAD-TRANSFERRING CONNECTION BETWEEN STRUCTURALLY LOADED COMPONENTS

(71) Applicant: Rockwell Collins, Inc., Cedar Rapids, IA (US)

(72) Inventors: Paolo Ballocchi, Newcastle (GB); Damian Christie, Armoy (GB)

(73) Assignee: Rockwell Collins, Inc., Cedar Rapids, IA (US)

( * ) Notice: Subject to any disclaimer, the term of this patent is extended or adjusted under 35 U.S.C. 154(b) by 606 days.

(21) Appl. No.: 16/029,074

(22) Filed: Jul. 6, 2018

(65) Prior Publication Data

US 2019/0376541 A1 Dec. 12, 2019

Related U.S. Application Data

(60) Provisional application No. 62/683,495, filed on Jun. 11, 2018.

(51) Int. Cl.
*F16B 5/06* (2006.01)
*B64C 1/00* (2006.01)
(Continued)

(52) U.S. Cl.
CPC .............. *F16B 5/0621* (2013.01); *B64C 1/00* (2013.01); *B64C 1/066* (2013.01); *B64C 1/12* (2013.01);
(Continued)

(58) Field of Classification Search
CPC .... B64C 1/00; B64C 1/12; B64C 1/26; B64C 1/066; B64C 1/068; B64C 1/069;
(Continued)

(56) References Cited

U.S. PATENT DOCUMENTS 3,002,717 A * 10/1961 Pavlecka .................. B64C 3/26
244/124
3,348,459 A * 10/1967 Harvey .................. E01C 9/083
404/35
(Continued)

FOREIGN PATENT DOCUMENTS

EP 3199455 A1 8/2017
WO 2009083262 A2 7/2009

OTHER PUBLICATIONS

Extended Search Report dated Oct. 16, 2019 for EP Application No. 19178536.9.

*Primary Examiner* — Joshua J Michener
*Assistant Examiner* — Arfan Y. Sinaki
(74) *Attorney, Agent, or Firm* — Suiter Swantz pc llo

(57) ABSTRACT

A system may include a fastener strap, a first component, and a second component. The fastener strap may include a strap section, at least one first stiffening rib section, and at least one second stiffening rib section. The first component may include a first strap section channel and at least one first stiffening rib section channel positioned along the first strap section channel. The second component may include a second strap section channel and at least one second stiffening rib section channel positioned along the second strap section channel. When the fastener strap is installed in the first strap section channel, the at least one first stiffening rib section channel, the second strap section channel, and the at least one second stiffening rib section channel, a load-bearing connection may be formed between the first component and the second component.

10 Claims, 12 Drawing Sheets

(51) Int. Cl.
  *B64C 1/06* (2006.01)
  *B64C 1/12* (2006.01)
  *B64C 3/26* (2006.01)
  *B64F 5/10* (2017.01)

(52) U.S. Cl.
  CPC ............... *B64C 3/26* (2013.01); *B64F 5/10* (2017.01); *B64C 2001/0072* (2013.01); *F16B 2005/0678* (2013.01)

(58) Field of Classification Search
  CPC .... B64C 1/06; B64C 3/18; B64C 3/26; B64C 3/187; B64C 7/00; B64C 2001/0072; F16B 2/08; F16B 2005/0678; F16B 5/0621; F16B 5/002; F16B 5/0635; F16B 5/121; F16B 5/0004; F16B 5/0032; F16B 5/004; F16B 5/0044; F16B 5/0048; F16B 5/0052; F16B 5/0056; F16B 5/006; F16B 5/0064; F16B 5/0068; F16B 5/0072; B64F 5/10; Y10T 403/7094; B63B 17/02; B63B 19/02
  See application file for complete search history.

(56) References Cited

U.S. PATENT DOCUMENTS

| | | | | |
|---|---|---|---|---|
| 3,417,529 A | * | 12/1968 | Archinal | F16B 5/0064 52/468 |
| 3,640,039 A | * | 2/1972 | McKee | F16B 5/0052 52/281 |
| 4,120,998 A | | 10/1978 | Olez | |
| 5,609,435 A | * | 3/1997 | Nomura | F16B 5/002 403/387 |
| 6,729,091 B1 | * | 5/2004 | Martensson | E04F 15/04 446/112 |
| 6,763,643 B1 | * | 7/2004 | Mårtensson | E04F 15/102 52/586.1 |
| 6,966,161 B2 | * | 11/2005 | Palsson | B44C 3/123 404/41 |
| 7,021,019 B2 | * | 4/2006 | Knauseder | E04F 13/10 24/297 |
| 7,665,264 B1 | * | 2/2010 | Wolfe | E04B 1/14 52/586.2 |
| 10,807,697 B2 | * | 10/2020 | Probst | B64C 27/04 |
| 2004/0139676 A1 | * | 7/2004 | Knauseder | E04F 15/02 52/578 |
| 2006/0059822 A1 | * | 3/2006 | Guffey | F16B 5/002 52/480 |
| 2010/0301165 A1 | * | 12/2010 | Gross | B64C 1/26 244/121 |
| 2013/0139462 A1 | * | 6/2013 | Noad | E04B 1/6175 52/582.2 |
| 2014/0353426 A1 | | 12/2014 | De Ruffray et al. | |
| 2015/0176619 A1 | * | 6/2015 | Baker | E04F 15/02038 52/586.2 |
| 2016/0333916 A1 | * | 11/2016 | Beaulieu | E04F 15/02038 |
| 2018/0141659 A1 | * | 5/2018 | Sher | B64C 3/26 |
| 2019/0136930 A1 | * | 5/2019 | Caron-L'Ecuyer | F16B 5/0241 |

\* cited by examiner

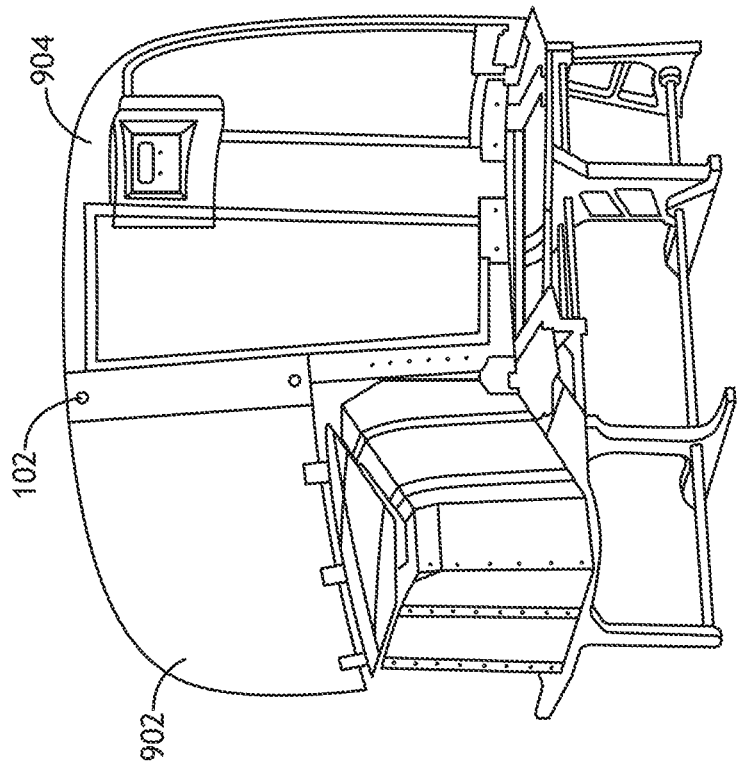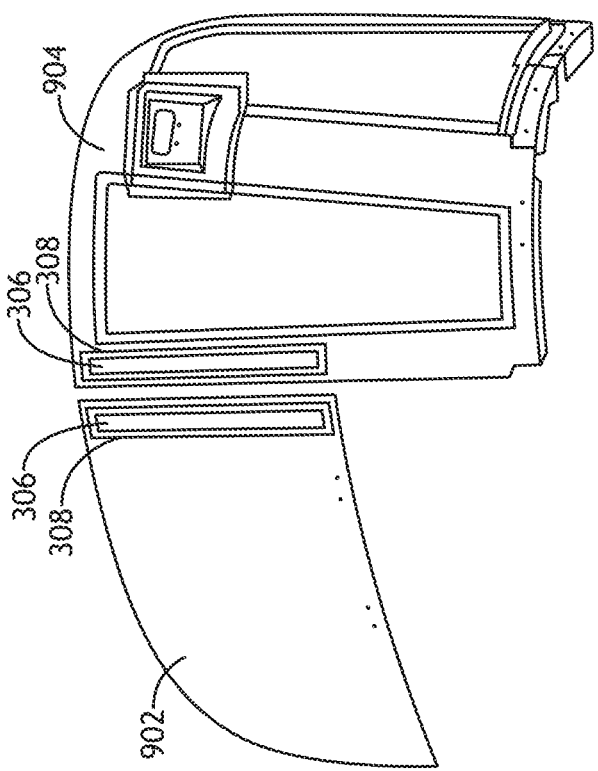
FIG. 9

LOAD-TRANSFERRING CONNECTION BETWEEN STRUCTURALLY LOADED COMPONENTS

CROSS-REFERENCE TO RELATED APPLICATIONS

The present application claims the benefit under 35 U.S.C. § 119(e) of U.S. Provisional Application Ser. No. 62/683,495, filed Jun. 11, 2018. U.S. Provisional Application Ser. No. 62/683,495 is herein incorporated by reference in its entirety.

BACKGROUND

Advances in composite materials and composite structures are enabling new means of designing, manufacturing and producing lightweight components and shell-structures. Examples of such innovative approaches in new composite materials includes the use of composite sandwich structures. These sandwich structures contain a lightweight foam material, sandwiched on either side with a composite (e.g., carbon fibre, Kevlar, or Zylon) skin. Complex shapes can be formed using this technique, but the joining of such complex shapes together, especially if they form a critical part of the load bearing structure can be challenging.

Typically, connection of highly loaded structural composite shells requires the use of rows of fasteners (e.g., rivets, nuts & bolts, nails, screws etc.) or the bonding of the structures with high strength glues. The use of conventional fastening techniques (e.g., quick-release fasteners, bolts, etc.) not only creates point stress-loadings along the joint, but due to the number of fasteners required, adds significant weight and adds fastening and unfastening complexity to the assembly and disassembly process which can add significant time to maintenance and repair operations.

SUMMARY

In one aspect, embodiments of the inventive concepts disclosed herein are directed to a system. The system may include a fastener strap, a first component, and a second component. The fastener strap may include a strap section, at least one first stiffening rib section, and at least one second stiffening rib section. The at least one first stiffening rib section and the at least one second stiffening rib section may extend outwardly from a side of the strap section. The at least one first stiffening rib section and the at least one second stiffening rib section may extend longitudinally along portions of the side of the strap section. The at least one first stiffening rib section may be parallel to the at least one second stiffening rib section. The first component may include a first strap section channel and at least one first stiffening rib section channel positioned along the first strap section channel. The first strap section channel and the at least one first stiffening rib section channel may be positioned along an edge of the first component. The first strap section channel may be configured to receive a first portion of the strap section of the fastener strap. The at least one first stiffening rib section channel may be configured to receive the at least one first stiffening rib section of the fastener strap. The second component may include a second strap section channel and at least one second stiffening rib section channel positioned along the second strap section channel. The second strap section channel and the at least one second stiffening rib section channel may be positioned along an edge of the second component. The second strap section channel may be configured to receive a second portion of the strap section of the fastener strap. The at least one second stiffening rib section channel may be configured to receive the at least one second stiffening rib section of the fastener strap. When the fastener strap is installed in the first strap section channel, the at least one first stiffening rib section channel, the second strap section channel, and the at least one second stiffening rib section channel, a load-bearing connection may be formed between the first component and the second component.

In a further aspect, embodiments of the inventive concepts disclosed herein are directed to a system. The system may include a fastener strap, a first composite shell, and a second composite shell. The fastener strap may include a strap section, two first stiffening rib sections with a first gap between the two first stiffening rib sections, and two second stiffening rib sections with a second gap between the two second stiffening rib sections. The two first stiffening rib sections and the two second stiffening rib sections may extend outwardly from a side of the strap section. The two first stiffening rib sections and the two second stiffening rib sections may extend longitudinally along portions of the side of the strap section. The two first stiffening rib sections may be parallel to the two second stiffening rib sections. The first gap and the second gap may be adjacently located along the fastener strap. The fastener strap may be more flexible at locations along the first and second gaps than at locations located along the two first stiffening rib sections and the two second stiffening rib sections. The first composite shell may include a first strap section channel and two first stiffening rib section channels positioned along the first strap section channel with a first corresponding gap between the two first stiffening rib section channels. The first strap section channel and the two first stiffening rib section channels may be positioned along an edge of the first composite shell. The first strap section channel may be configured to receive a first portion of the strap section of the fastener strap. The two first stiffening rib section channels may be configured to receive the two first stiffening rib sections of the fastener strap. The second composite shell may include a second strap section channel and two second stiffening rib section channels positioned along the second strap section channel with a second corresponding gap between the two second stiffening rib section channels. The second strap section channel and the two second stiffening rib section channels may be positioned along an edge of the second composite shell. The second strap section channel may be configured to receive a second portion of the strap section of the fastener strap. The two second stiffening rib section channels may be configured to receive the two second stiffening rib sections of the fastener strap. When the fastener strap is installed in the first strap section channel, the two first stiffening rib section channels, the second strap section channel, and the two second stiffening rib section channels, a load-bearing connection may be formed between the first composite shell and the second composite shell.

In a further aspect, embodiments of the inventive concepts disclosed herein are directed to a system. The system may include a fastener strap, a panel, a component, and a second fastener strap. The fastener strap may include a strap section, at least one first stiffening rib section, and at least one second stiffening rib section. The at least one first stiffening rib section and the at least one second stiffening rib section may extend outwardly from a side of the strap section. The at least one first stiffening rib section and the at least one second stiffening rib section may extend longitudinally along portions of the side of the strap section. The at least one first stiffening rib section may be parallel to the at least one second stiffening rib section. The panel may include a first strap section channel and at least one first stiffening rib section channel positioned along the first strap section channel. The first strap section channel and the at least one first stiffening rib section channel may be positioned along an edge of the panel. The first strap section channel may be configured to receive a first portion of the strap section of the fastener strap. The at least one first stiffening rib section channel may be configured to receive the at least one first stiffening rib section of the fastener strap. The component may include a second strap section channel and at least one second stiffening rib section channel positioned along the second strap section channel. The second strap section channel and the at least one second stiffening rib section channel may be positioned along an edge of the component. The second strap section channel may be configured to receive a second portion of the strap section of the fastener strap. The at least one second stiffening rib section channel may be configured to receive the at least one second stiffening rib section of the fastener strap. The second fastener strap may be installed on the panel and the component, the second fastener strap installed on opposite sides of the panel and the component as the fastener strap. When the fastener strap is installed in the first strap section channel, the at least one first stiffening rib section channel, the second strap section channel, and the at least one second stiffening rib section channel and when the second fastener strap is installed on the panel and the component, a load-bearing connection may be formed between the panel and the component.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 9 is perspective views of an exemplary embodiment of a first panel, a second panel, and at least one fastener strap implemented in an interior of an aircraft according to the inventive concepts disclosed herein.

DETAILED DESCRIPTION

Figure 1:
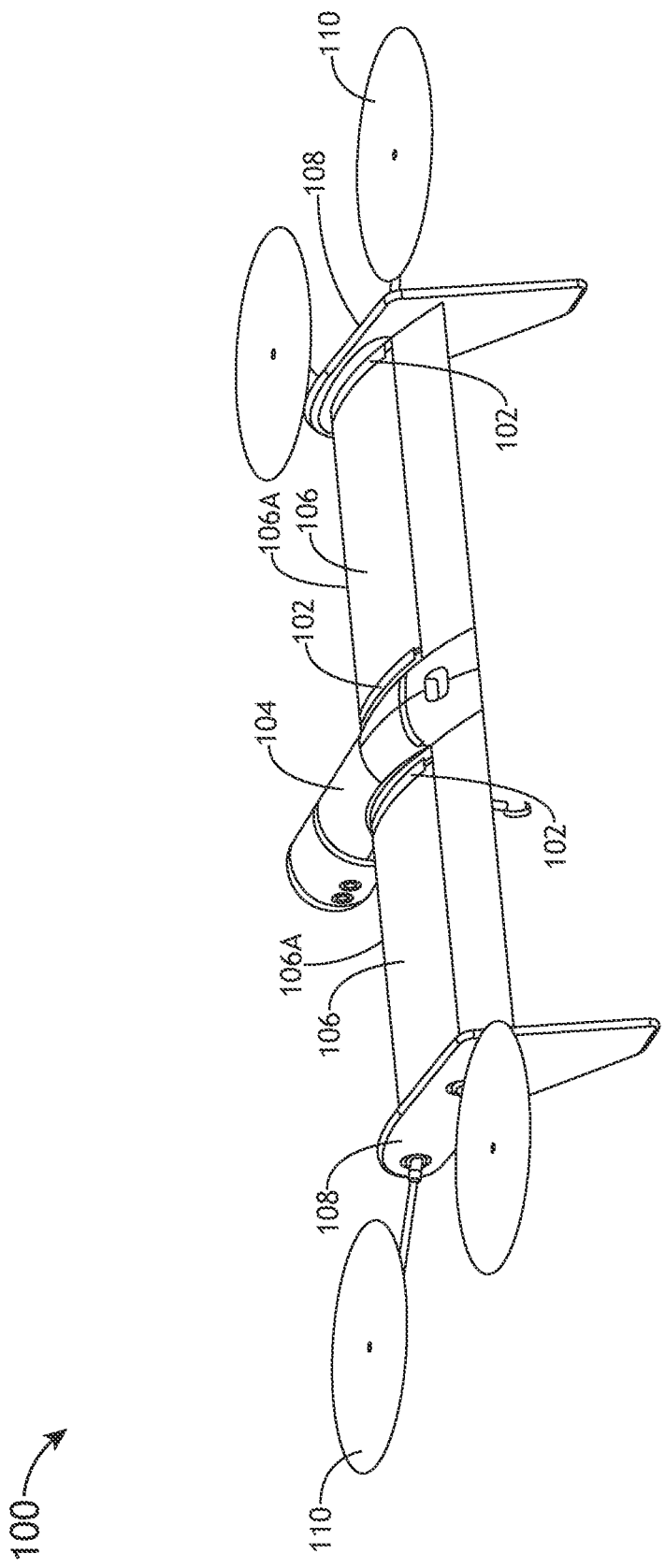
FIG. 1 is a view of an exemplary embodiment of a drone according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed a method of creating and system of a load-transferring connection between structurally loaded components (e.g., composite shells or panels).

Using standard fixing techniques, such as screw fasteners, creates stress raisers around these fasteners. Furthermore, in order to reduce these "point" fastener stress raises, a larger number of fasteners is required, increasing both assembly and disassembly time.

The use of advanced materials and structures (e.g., a laminate or a composite shell comprising a composite sandwich structure including a lightweight foam material core sandwiched on either side with a composite skin (e.g., carbon, Kevlar, or Zylon)) is key to producing extremely lightweight, but exceptionally strong body-shell structures for products such as long-range, long-endurance drones and aircraft seating. The challenge lies in the assembly, disassembly and fixing of these extremely lightweight body-shell structures with equivalent strong and lightweight fastening solutions.

Embodiments may include a connection (e.g., a fastener strap) that when installed can transfer structural loads from one loaded component (e.g., a composite shell or panel) to another loaded component, across edge interfaces of the loaded components. Such connection may not affect aerodynamics or a profile such that the connection would have a smooth and flush interface between the two or more loaded components (e.g., composite structural shells or laminates). Such connection may be easy to assemble and disassemble as compared to a typical line of rivets or fasteners. Such connection may deliver quick rig and de-rig capability.

Embodiments may include a lightweight, part rigid, part flexible thin composite fastener strap that is able to sustain sideways loads when installed. The fastener strap may include two or more stiffening ribs, set apart from each other by a certain distance. Each stiffening rib locks into an equivalent single channel formed within each of two components (e.g., composite shell structures or panels) to be joined. An additional load-bearing structure (e.g., a support frame), when required, may support the joint from below or within, such that the support frame is contained within the two components (e.g., composite shell structures or panels) and the fastener strap. At each extremity of the strap are location points which can be counter-sunk to enable a single attachment means (e.g., fastener, a quick-release fastener, a screw, a pin, a bolt, a nut, a latch, and/or holes) to lie flush with the strap and outer surfaces of the components (e.g., composite shell structures or panels) to be joined and tie the fastener strap to the lower support-bearing structure (e.g., support frame). Embodiments may include a connection between structurally loaded components (e.g., composite shell structures or panels) that is capable of transferring compression and tension loads. Some Embodiments may allow for quick assembly and disassembly of subassemblies (e.g., vehicular or aircraft subassemblies). Additionally, embodiments may allow for continuity to an outer surface (e.g., a flushness across outers surfaces of two components and the fastener strap), that can be a key parameter for aerodynamic efficiency of aircraft exteriors and for cosmetic appearance and tribology wear & tear (e.g., from trolleys and passengers) in aircraft interiors.

Embodiments may include a lightweight composite structure fastener strap. The fastener strap may include a double ribbed strap, by which the strap locks into channels of two components (e.g., composite shell structures or panels) by means of the ribs. These ribs may lock directly into channels that have been molded into or formed in the components (e.g., lightweight composite skins of composite shell structures or panels) that may butt up against an underlying load bearing structure (e.g., support frame). The composite, lightweight fastener strap may be flexible, such that fastener strap can be adapted through flexure to fit around lightweight composite skins and may immediately hold the two adjoining composite skins in place before the final attachment means (e.g., end fasteners) have been securely fixed. The entire fastener strap when fully fastened may lie flush with the other components being joined.

Embodiments may include joining thin, lightweight composite shell-structures together in such a way that potentially high tensile and compressive loads can be evenly transmitted across the shell-structure joint without risk of joint or composite shell-structure failure. Furthermore, embodiments may also incorporate a lightweight, rapid assembly and disassembly method to quickly tie the composite shell-structures together as well as quickly release them, as and when required.

The attachment means for fixing the fastener strap to the underlying load-bearing structure (e.g., support frame) may be provided by a quick-release fastener, a screw, a pin, a bolt, a nut, a latch, a lock mechanism, a rivet, a mechanical pin device, and/or holes.

Embodiments may include the use of extremely strong and lightweight composite sandwich structures comprising a thin (e.g., 3 mm) lightweight foam core sandwiched between two very thin (e.g., 0.3 mm to 0.6 mm) external skins (e.g, carbon-fibre, Kevlar, Zylon or equivalent composite skins) to form a structural body component that can be joined to another component via a fastener strap.

Embodiments may include a means of rigidly joining together by butting up two components (e.g., composite shell structures or panels) with a minimal, quick release fastening solution, such that compressive and tensile loads can be evenly transmitted through the joint without any stress raisers being present.

Embodiments may include the ability to quickly and flexibly access components such as electronic sub-systems (e.g., batteries, wiring, computing devices, sensors, antennas, and/or connectors) underneath outer skin shell-structures (e.g., a wing section or fuselage section) by means of a quick assembly and quick release fastening mechanism enabling at least one of potentially multiple molded composite sandwich structures to be removed quickly and easily. For example, the fastener strap may be installed in less than one minute to connect two components, and the fastener strap may be removed in less than one minute to disassemble two components.

Embodiments may include providing attachment means coupled to a fastener strap, whereby the attachment means does not get easily dropped and get lost when working on the composite product in challenging environments. For example, the attachment means may be affixed to the fastener strap.

Embodiments may include the fastener strap being able to provide a precise, robust, quick-release mechanism, for connecting very thin, lightweight composite sandwich structures.

Embodiments may include the ability to ensure that a joint is successfully sealed such that water (or other fluid) ingress is suppressed or at least minimized.

In some embodiments, the fastener strap may include a flexible section within the overall length of the fastener strap to enable the composite fastener strap to open up around a supporting structure (e.g., a wing-rib) and provide a natural clamping mechanism.

Referring now to FIG. 1, an exemplary embodiment of a drone 100 according to the inventive concepts disclosed herein is depicted. The drone 100 may be composed of a plurality of composite shell components. For example, the assembly of a drone fuselage body and associated wing shells may be manufactured using a composite shell-structure technique. For example, the drone 100 may include a fuselage composite shell 104, two wing composite shells 106, and two rotor assembly composite shells 108 having rotors 110 attached thereto. The drone 100 may include fastener straps 102 that connect various of the composite shell components to one another. For example, the fuselage composite shell 104 may be connected to the two wing composite shells 106 via two fastener straps 102. For example, each of the two wing composite shells 106 may be connected to a rotor assembly composite shell 108 via a fastener strap 102. The fastener straps 102 allow the drone 100 to be quickly assembled and disassembled. When installed, the fastener straps 102 may evenly transmit compressive and tensile loads through joints with abutting composite shell components without any stress raisers being present.

Figure 2:
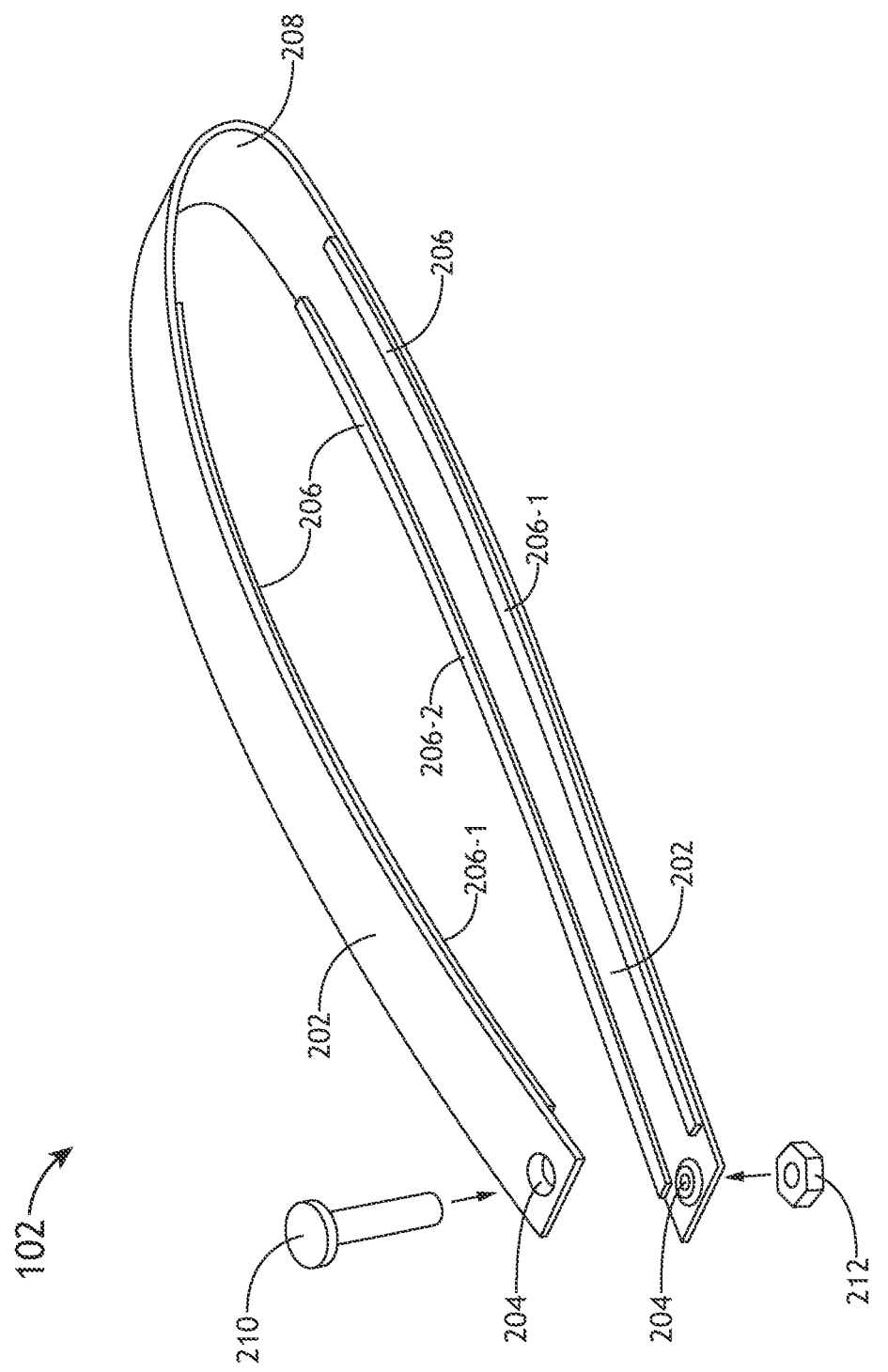
FIG. 2 is a view of an exemplary embodiment of a fastener strap according to the inventive concepts disclosed herein.

Referring now to FIG. 2, an exemplary embodiment of a fastener strap 102 according to the inventive concepts disclosed herein is depicted. The fastener strap 102 may include a strap section 202, at least one (e.g., two, as shown) first stiffening rib section 206-1, at least one (e.g., two, as shown) second stiffening rib section 206-2, holes 204, a bolt 210, and a nut 212. In some embodiments, the fastener strap 102 may be made of carbon fibre, Kevlar, Zylon, or a combination thereof.

The at least one first stiffening rib section 206-1 and the at least one second stiffening rib section 206-2 may extend outwardly from a side (e.g., an inwardly facing side) of the strap section 202. The at least one first stiffening rib section 206-1 and the at least one second stiffening rib section 206-2 may extend longitudinally along portions of the side of the strap section 202. The at least one first stiffening rib section 206-1 may be parallel to the at least one second stiffening rib section 206-2. In some embodiments where there are two first stiffening rib sections 206-1 and two second stiffening rib sections 206-2, there is a first gap between the two first stiffening rib sections 206-1 and a second gap between the two second stiffening rib sections 206-2. The first gap and the second gap may be adjacently located along the fastener strap 102 at a more flexible section 208, wherein the fastener strap 102 may be more flexible at locations along the first and second gaps than at locations located along the two first stiffening rib sections 206 and the two second stiffening rib sections 206. For example, the first and second gaps may allow the fastener strap 102 to bend around corresponding curved sections (e.g., leading edges 106A and/or 302A of wing sections) of first and second components (e.g., composite shell structures or panels) being joined. In some embodiments, the stiffening rib sections 206-1, 206-2 do not extend an entire length of the fastener strap 102; for example, a flexible section 208 of the fastener strap 102 may be rib-free. For example, the flexible section 208 may enable the fastener strap 102 to be slipped over a joint easily and quickly. The flexible section 208 may act as a spring mechanism allowing the stiffening rib sections 206-1, 206-2 to lock with channels formed in the two to-be-joined components (e.g., composite shell-structure components), thus already locking the two components together prior to, for example, final quick-release fasteners, screws, pins, or bolt fasteners being tightened up.

In some embodiments, the stiffening rib sections 206-1, 206-2 may extend continuously and substantially (e.g., except for near the holes 204) the entire length of the fastener strap 102, for example, so that two panels (e.g., 1202, 1204) can be joined with two, oppositely installed fastening straps 102.

The fastener strap 102 may include attachment means for securing first and second ends of the fastener strap 102 against a first component and the second component, as well as an underlying support frame (e.g., 304) (if any). For example, the attachment means may include a quick-release fastener, a screw, a pin, a bolt 210, a nut 212, a latch, a lock mechanism, a rivet, a mechanical pin device, and/or holes 204. The holes 204 may be countersunk to accommodate quick-release fasteners, screws, pins, or bolts and so as to allow a quick-release fastener, a screw, a pin, a bolt 210, a nut 212, a latch, a lock mechanism, a rivet, and/or a mechanical pin device to be flush along an exterior surface of the fastener strap 102.

Figure 3:
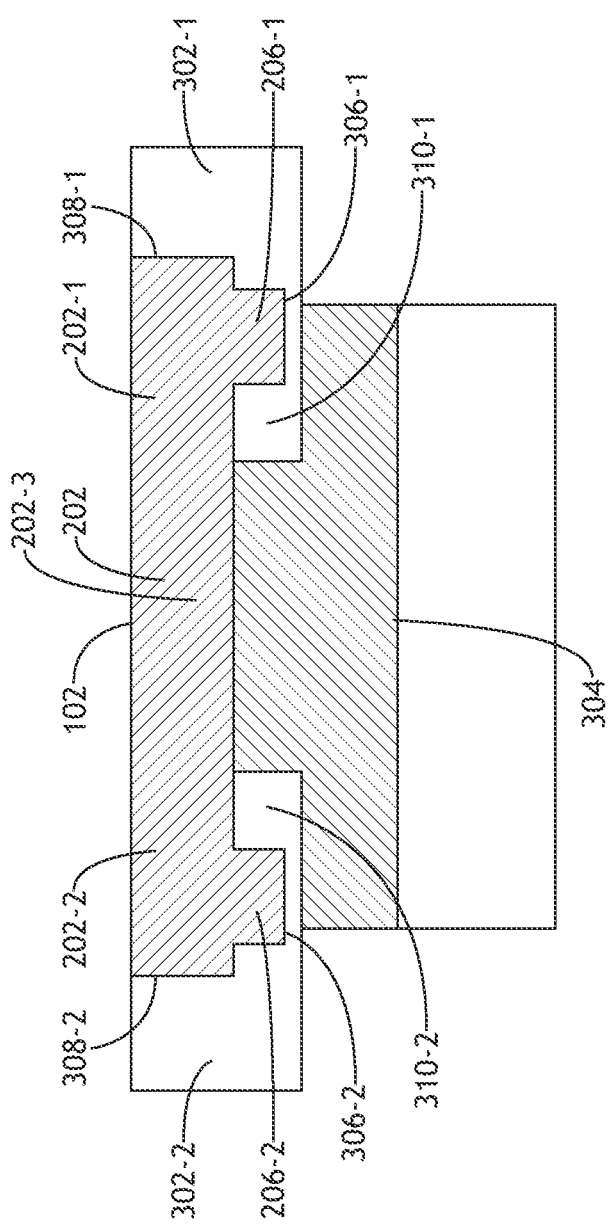
FIG. 3 is a cross-sectional view of an exemplary embodiment of a fastener strap connecting two components supported by a support frame according to the inventive concepts disclosed herein.

Referring now to FIG. 3, a cross-sectional view of an exemplary embodiment of a fastener strap 102 connecting two components 302 (e.g., 302-1, 302-2) supported by a support frame 304 according to the inventive concepts disclosed herein is depicted.

The two components 302 may be any suitable components to be joined by the fastener strap 102. For example, the two components 302 may be implemented as composite shell components or panels. For example, the two components 302 may be vehicular components (e.g., aircraft components, train components, watercraft components, and/or automobile components). For example, the two components 302 may be implemented as or include at least one fuselage composite shell 104, at least one wing composite shell 106, and/or at least one rotor assembly composite shell 108. For example, the two components 302 may be implemented as aircraft interior panels, such as used for seating assemblies or wall panels in an aircraft.

The two components 302 may abut each other or an intervening support frame 304. The fastener strap 102 may fit over edges 310-1, 310-2 of the two components 302 and/or the support frame 304. For example, the support frame 304 may support the edges 310-1, 310-2 of the two components 302 and a middle portion 202-3 of the strap section 202 of the fastener strap 102.

A first 302-1 of the two components 302 may have a first strap section channel 308-1 and at least one first stiffening rib section channel 306-1 positioned along the first strap section channel 308-1. The first strap section channel 308-1 and the at least one first stiffening rib section channel 306-1 may be positioned along at least one edge of the first component 302-1. The first strap section channel 308-1 may be configured to receive a first portion 202-1 of the strap section 202 of the fastener strap 102. The at least one first stiffening rib section channel 306-1 may be configured to receive the at least one first stiffening rib section 206-1 of the fastener strap 102. In some embodiments where there are two first stiffening rib sections 206-1 and two second stiffening rib sections 206-2 on the fastener strap 102, the first component 302-1 includes two first stiffening rib section channels 306-1 positioned along the first strap section channel 308-1 with a first corresponding gap between the two first stiffening rib section channels 306-1 such that the two first stiffening rib section channels 306-1 may be configured to receive the two first stiffening rib sections 206-1 of the fastener strap 102.

A second 302-2 of the two components 302 may have a second strap section channel 308-2 and at least one second stiffening rib section channel 306-2 positioned along the second strap section channel 308-2. The second strap section channel 308-2 and the at least one second stiffening rib section channel 306-2 may be positioned along at least one edge of the second component 302-2. The second strap section channel 308-2 may be configured to receive a second portion 202-2 of the strap section 202 of the fastener strap 102. The at least one second stiffening rib section channel 306 may be configured to receive the at least one second stiffening rib section 206-2 of the fastener strap 102. In some embodiments where there are two first stiffening rib sections 206-1 and two second stiffening rib sections 206-2 on the fastener strap 102, the second component 302-2 includes two second stiffening rib section channels 306-2 positioned along the second strap section channel 308-2 with a second corresponding gap between the two second stiffening rib section channels 306 such that the two second stiffening rib section channels 306-2 may be configured to receive the two second stiffening rib sections 206-2 of the fastener strap 102.

When the fastener strap 102 is installed in the first strap section channel 308-1, the at least one first stiffening rib section channel 306-1, the second strap section channel 308-2, and the at least one second stiffening rib section channel 306-2, a load-bearing connection is formed between the first component 302-1 and the second component 302-2.

Figure 4:
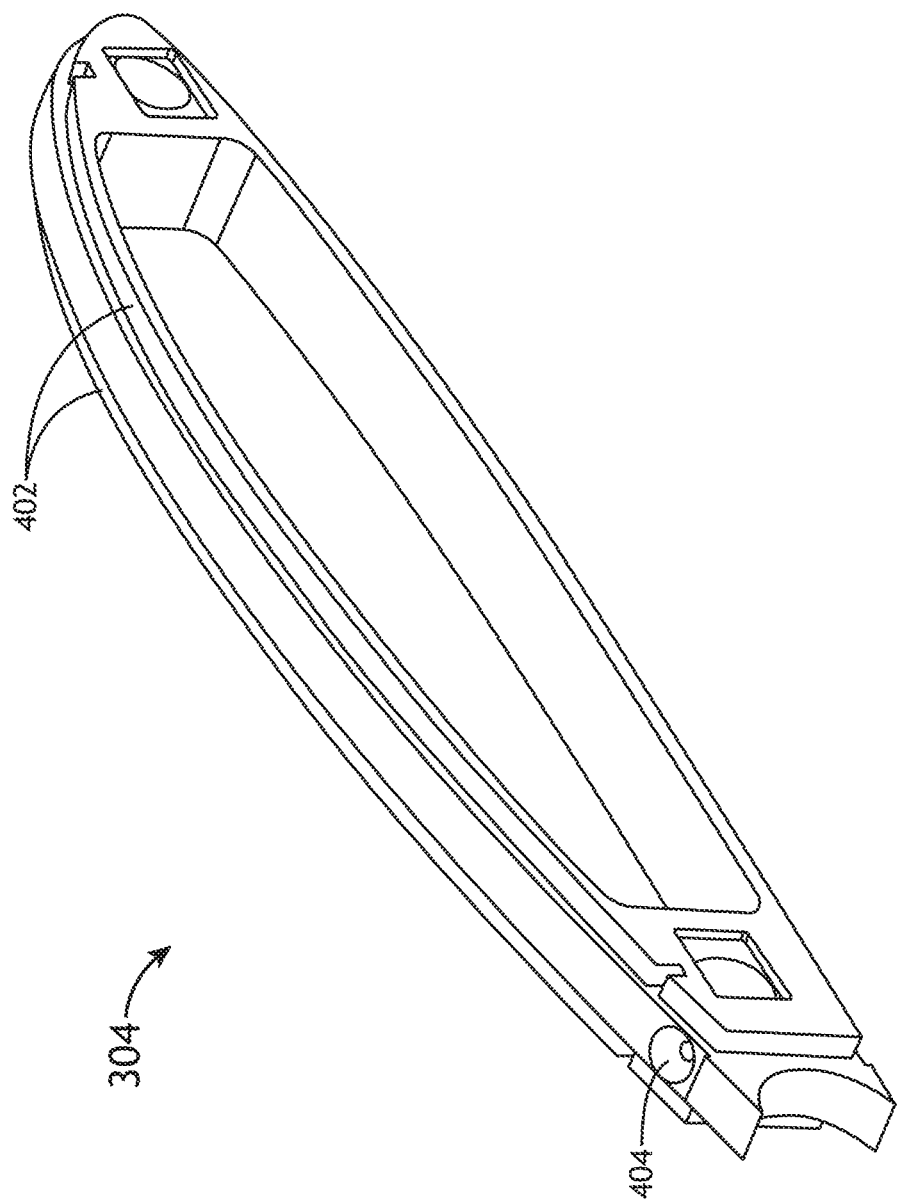
FIG. 4 is a perspective view of an exemplary embodiment of a support frame according to the inventive concepts disclosed herein.

Referring now to FIG. 4, a perspective view of an exemplary embodiment of a support frame 304 according to the inventive concepts disclosed herein is depicted. For example, the support frame 304 depicted is a drone wing rib; however, any suitable support frame may be used for any suitable application. The support frame 304 may include at least one hole 404 configured to accommodate a screw, a pin, a bolt 210, a rivet, and/or a mechanical pin device of the attachment means. In some embodiments, the at least one hole 404 is threaded. The support frame 304 may include ridges 402 configured to accommodate composite shells components (e.g., 104, 106, 108). The support frame 304 may include a central opening where cables and wires can pass through a wing of a drone 100.

Figure 5:
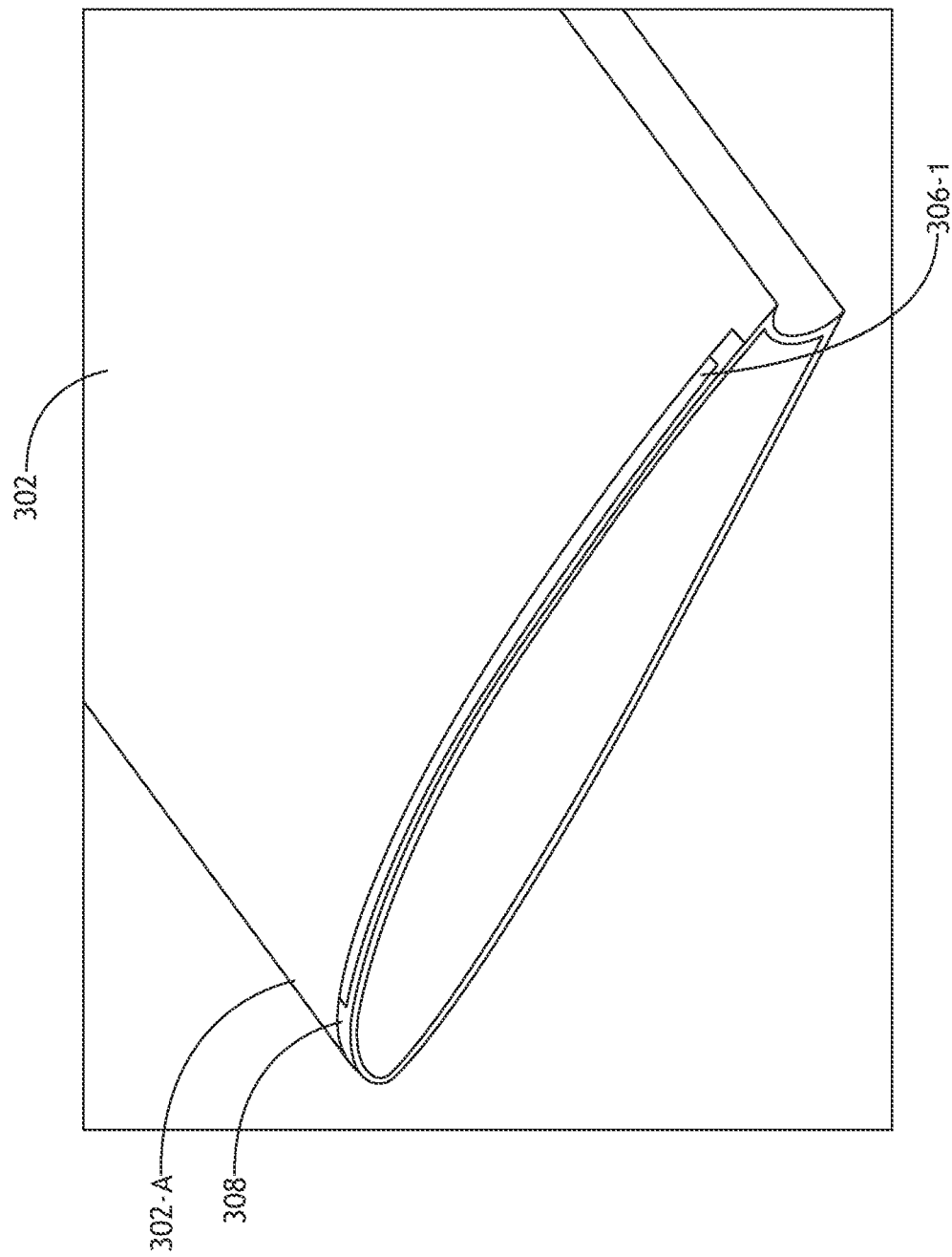
FIG. 5 is a perspective view of an exemplary embodiment of a component according to the inventive concepts disclosed herein.
Figure 6:
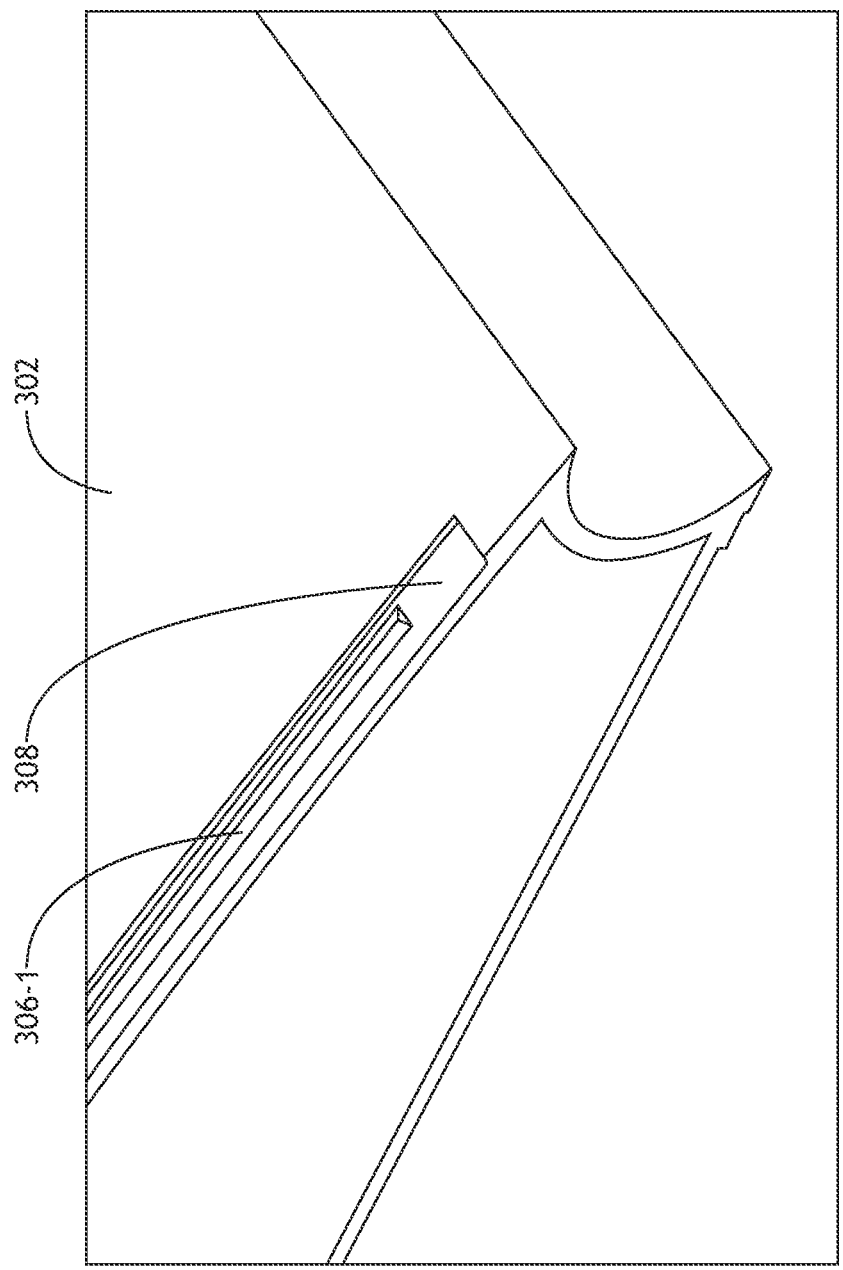
FIG. 6 is a further perspective view of the component of FIG. 5 according to the inventive concepts disclosed herein.

Referring now to FIGS. 5-6, perspective views of an exemplary embodiment of a component 302 according to the inventive concepts disclosed herein is depicted. For example, the component 302 depicted is a wing composite shell (e.g., 106). The component 302 may include two stiffening rib section channels 306-1 positioned along the strap section channel 308. For example, the component may include a stiffening rib section channel 306-1 on a top side of the wing composite shell (e.g., 106) and a stiffening rib section channel 306-1 on the bottom side of the wing composite shell (e.g., 106). In some embodiments, the shape and configuration of the channels 306, 308 may be designed so that the channels 306-1, 308 provide a self-locking or self-fixing fit when the fastener strap 102 is inserted into the channels 306-1, 308.

Figure 7:
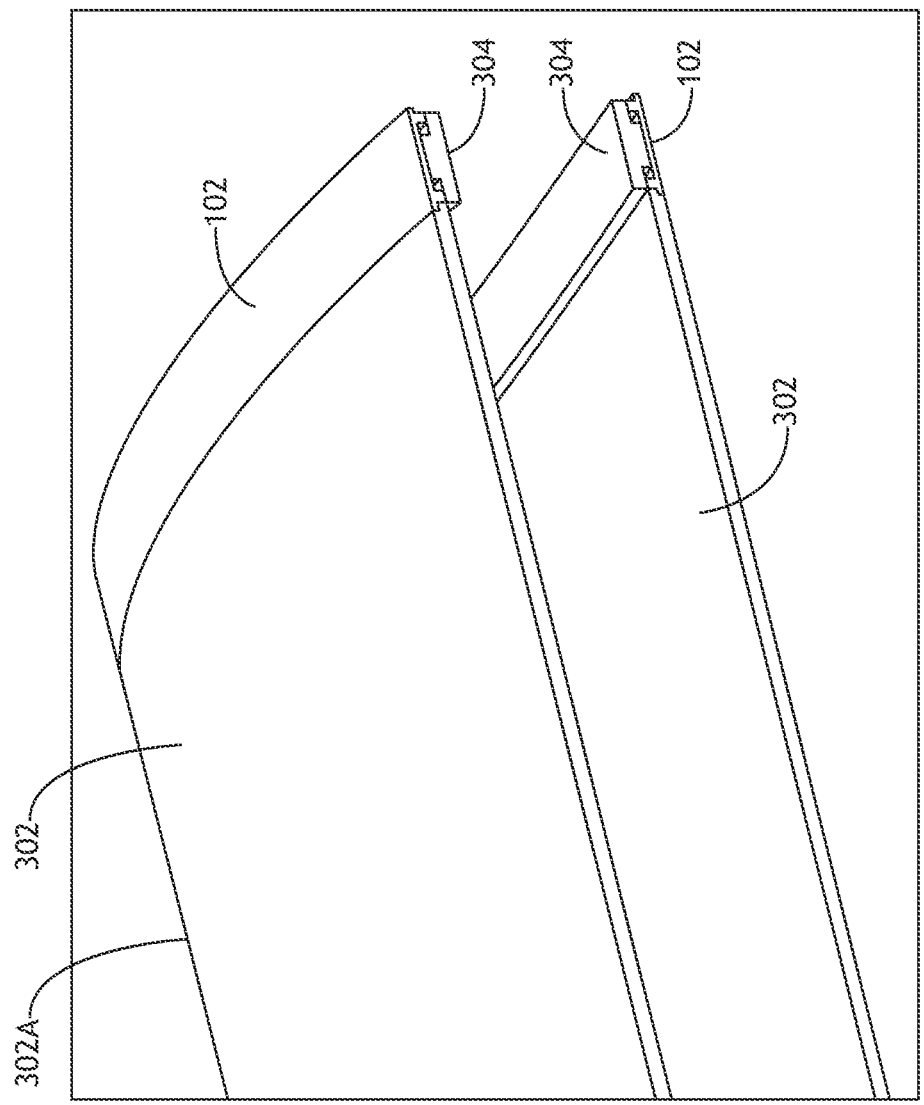
FIG. 7 is a perspective cut-away view of an exemplary embodiment of a component, a support frame, and a fastener strap according to the inventive concepts disclosed herein.

Referring now to FIG. 7, a perspective cut-away view of an exemplary embodiment of a component 302, a support frame 304, and a fastener strap 102 according to the inventive concepts disclosed herein is depicted. For example, the component 302 depicted is a wing composite shell (e.g., 106).

Figure 8:
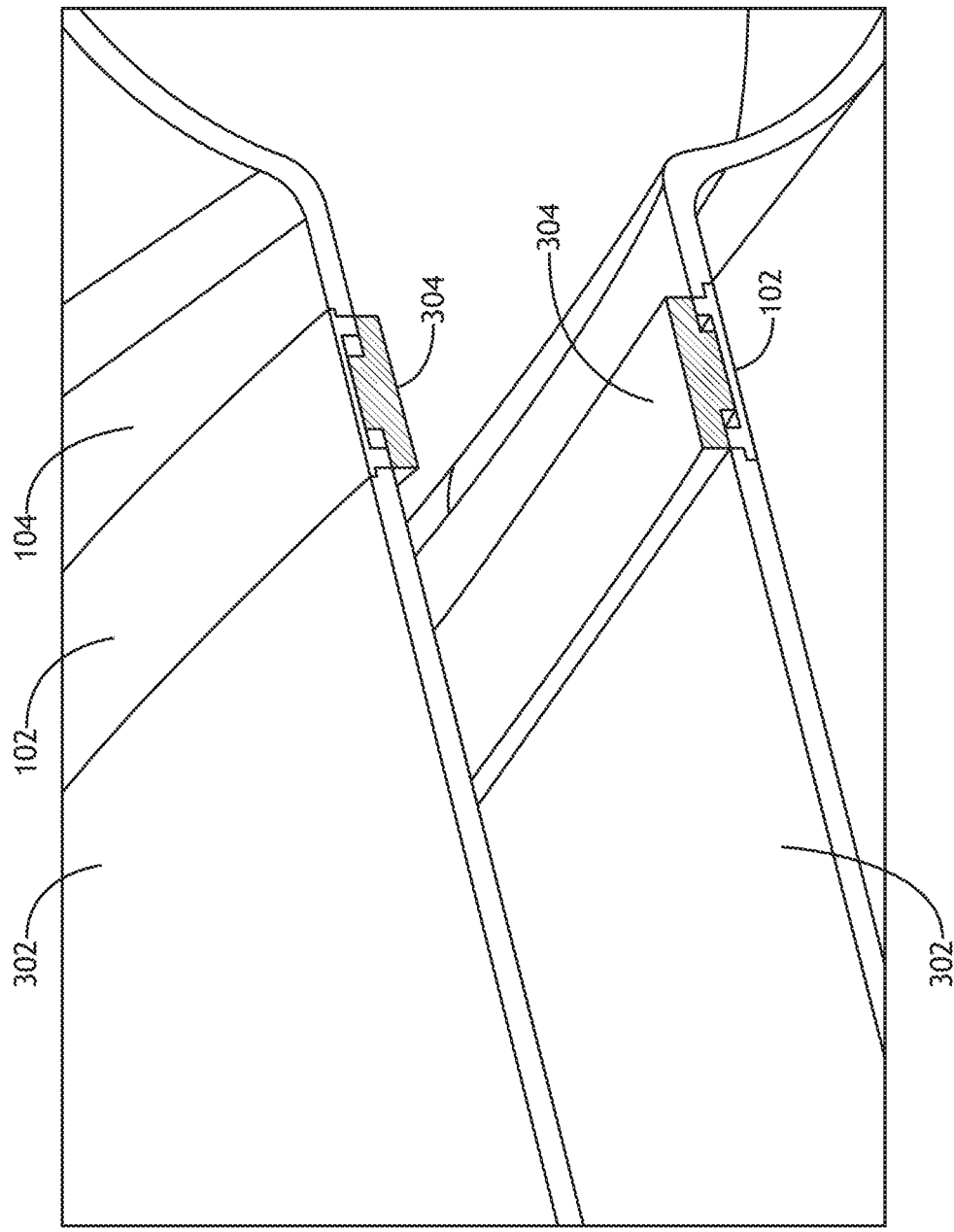
FIG. 8 is a perspective cut-away view of an exemplary embodiment of a first component, a second component, a support frame, and a fastener strap according to the inventive concepts disclosed herein.

Referring now to FIG. 8, a perspective cut-away view of an exemplary embodiment of a first component 302, a second component (e.g., fuselage composite shell 104), a support frame 304, and a fastener strap 102 according to the inventive concepts disclosed herein is depicted. For example, the component 302 depicted is a wing composite shell (e.g., 106). The fastener strap 102 may be configured to connect the first component (e.g., a wing composite shell (e.g., 106)) to the second component (e.g., fuselage composite shell 104). As shown, the fastener strap 102 may be flush with the exterior surfaces of the first component (e.g., a wing composite shell (e.g., 106)) and the second component (e.g., fuselage composite shell 104).

Referring now to FIG. 9, perspective views of an exemplary embodiment of a first panel 902, a second panel 904, and at least one fastener strap 102 implemented in an interior of an aircraft according to the inventive concepts disclosed herein are depicted. The panels 902, 904 may be implemented as aircraft interior panels. For example, the panel 902 may be a wall panel. For example, the panel 904 may be a panel of an aircraft seating assembly. For example, the panels 902, 904 may be composite structurally loaded panels in an aircraft interior. Embodiments may be applied to aircraft interiors, where surface continuity, strong structural connection and easy rig and de-rig are important.

For example, the panels 902, 904 may be joined with two fastener straps 102. The two fastener straps 102 may be configured to connect the panel 902 to the panel 904. For example, a first fastener strap 102 (shown) may be installed in channels 306, 308 of first sides of the panels 902, 904. A second fastener strap 102 (not shown) may be installed in channels 306, 308 of second sides of the panels 902, 904. The second fastener strap 102 (not shown) may be installed on opposite sides of the panels 902, 904 as the first fastener strap 102 (shown). When the fastener strap 102 is installed in the channels 306, 308 and when the second fastener strap 102 is similarly installed on the panels 902, 904, a load-bearing connection may be formed between the panels 902, 904.

Figure 10:
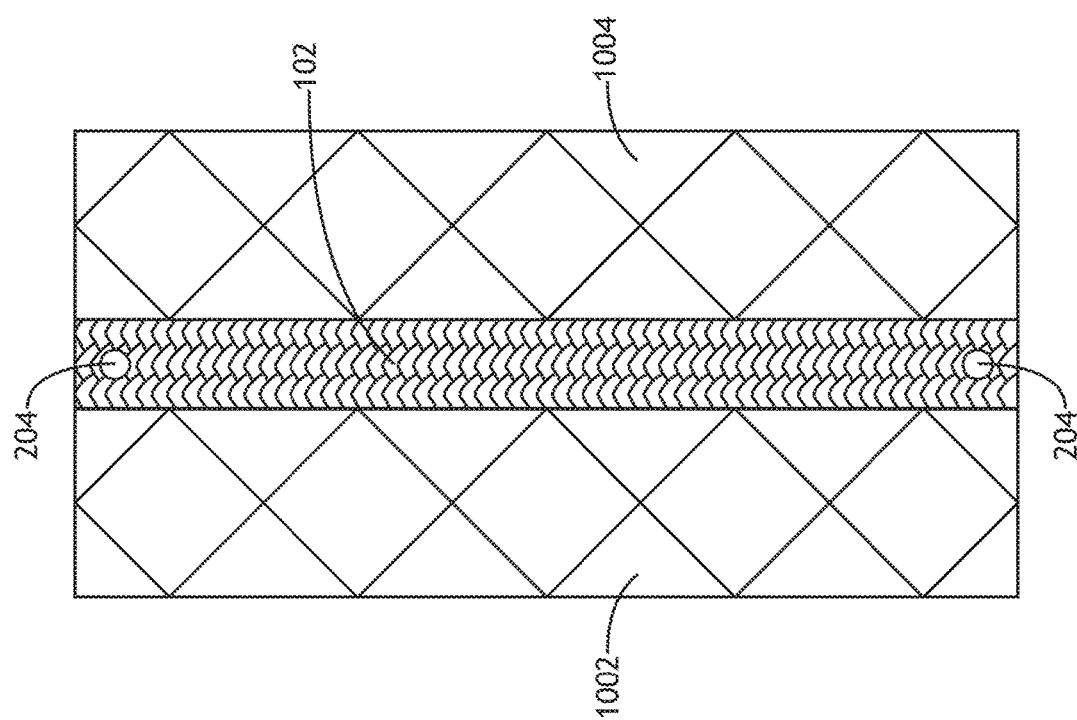
FIG. 10 is a front view of an exemplary embodiment of a first panel, a second panel, and at least one fastener strap according to the inventive concepts disclosed herein.
Figure 11:
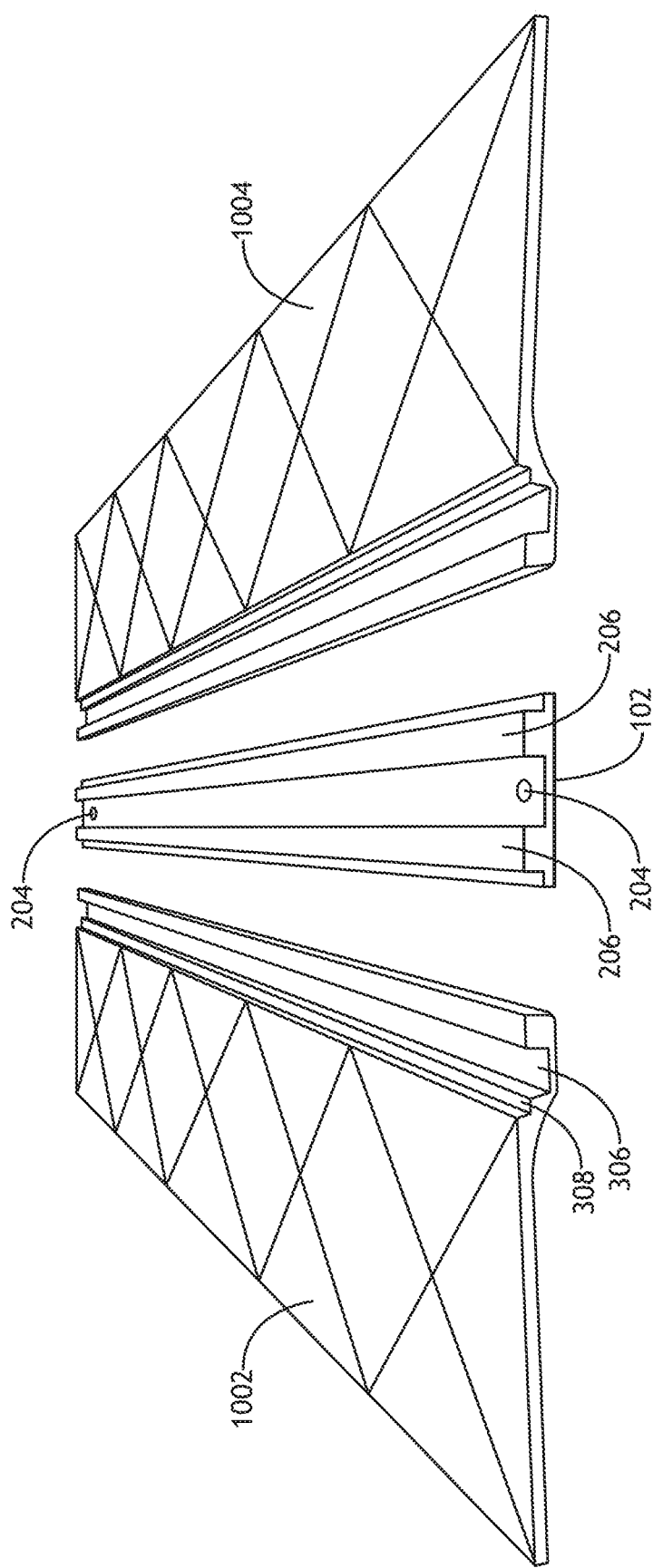
FIG. 11 is an exploded top perspective view of the first panel, the second panel, and the at least one fastener strap of FIG. 10.

Referring now to FIGS. 10-11, a front view and an exploded top perspective view of an exemplary embodiment of a first panel 1002, a second panel 1004, and at least one fastener strap 102 according to the inventive concepts disclosed herein are depicted. When the fastener strap 102 is installed in on the panels 1002, 1004, a load-bearing connection may be formed between the panels 1002, 1004.

Figure 12:
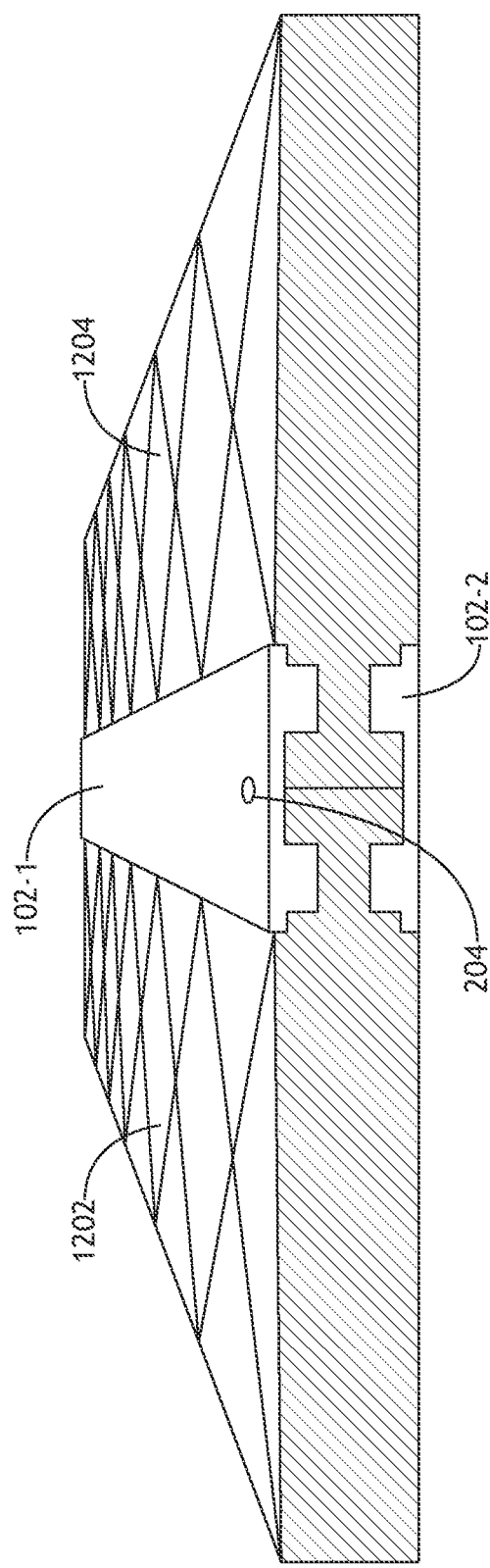
FIG. 12 is a top perspective view of an exemplary embodiment of a first panel, a second panel, and two fastener straps according to the inventive concepts disclosed herein.

Referring now to FIG. 12, a top perspective view of an exemplary embodiment of a first panel 1202, a second panel 1204, and two fastener straps 102-1, 102-2 according to the inventive concepts disclosed herein is depicted. The two fastener straps 102-1, 102-2 may be configured to connect the panel 1202 to the panel 1204. For example, a first fastener strap 102-1 may be installed in channels 306, 308 of first sides of the panels 1202, 1204. A second fastener strap 102-2 may be installed in channels 306, 308 of second sides of the panels 1202, 1204. The second fastener strap 102-2 may be installed on opposite sides of the panels 1202, 1204 as the first fastener strap 102-1. When the fastener straps 102-1, 102-2 are installed on the panels 1202, 1204, a load-bearing connection may be formed between the panels 1202, 1204.

As will be appreciated from the above, embodiments of the inventive concepts disclosed herein may be directed to a method of creating and system of a load-transferring connection between structurally loaded components (e.g., composite shells or panels).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a fastener strap comprising a strap section, two first stiffening rib sections with a first gap between the two first stiffening rib sections, and two second stiffening rib sections with a second gap between the two second stiffening rib sections, the two first stiffening rib sections and the two second stiffening rib sections extending outwardly from a side of the strap section, the two first stiffening rib sections and the two second stiffening rib sections extending longitudinally along portions of the side of the strap section, the two first stiffening rib sections being parallel to the two second stiffening rib sections, wherein the first gap and the second gap are adjacently located along the fastener strap, wherein the fastener strap is more flexible at locations along the first and second gaps than at locations located along the two first stiffening rib sections and the two second stiffening rib sections;
a first composite shell comprising a first strap section channel and two first stiffening rib section channels positioned along the first strap section channel with a first corresponding gap between the two first stiffening rib section channels, the first strap section channel and the two first stiffening rib section channels positioned along at least one edge of the first composite shell, the first strap section channel configured to receive a first portion of the strap section of the fastener strap, the two first stiffening rib section channels configured to receive the two first stiffening rib sections of the fastener strap; and
a second composite shell comprising a second strap section channel and two second stiffening rib section channels positioned along the second strap section channel with a second corresponding gap between the two second stiffening rib section channels, the second strap section channel and the two second stiffening rib section channels positioned along at least one edge of the second composite shell, the second strap section channel configured to receive a second portion of the strap section of the fastener strap, the two second stiffening rib section channels configured to receive the two second stiffening rib sections of the fastener strap,
wherein, when the fastener strap is installed in the first strap section channel, the two first stiffening rib section channels, the second strap section channel, and the two second stiffening rib section channels, a load-bearing connection is formed between the first composite shell and the second composite shell.

2. The system of claim 1, further comprising attachment means, the fastener strap having first and second ends, the attachment means configured to secure the first and the second ends of the fastener strap against the first composite shell and the second composite shell.

3. The system of claim 1, wherein the second composite shell is a wing composite shell, a fuselage composite shell, or a rotor section of a drone.

4. The system of claim 1, wherein the first composite shell is a wing composite shell and the second composite shell is a fuselage composite shell.

5. The system of claim 1, wherein the first and second gaps allow the fastener strap to bend around corresponding curved sections of the first and second composite shells.

6. The system of claim 1, further comprising a support frame, the support frame abutting a portion of the first composite shell and a portion of the second composite shell, the support frame configured to support a middle portion of the strap section of the fastener strap.

7. The system of claim 1, wherein the first composite shell is a wing composite shell, a fuselage composite shell, or a rotor section composite shell of a drone.

8. A system, comprising:
a fastener strap comprising a strap section, at least one first stiffening rib section, and at least one second stiffening rib section, the at least one first stiffening rib section and the at least one second stiffening rib section extending outwardly from a side of the strap section, the at least one first stiffening rib section and the at least one second stiffening rib section extending longitudinally along portions of the side of the strap section, the at least one first stiffening rib section being parallel to the at least one second stiffening rib section;
a panel comprising a first strap section channel and at least one first stiffening rib section channel positioned along the first strap section channel, the first strap section channel and the at least one first stiffening rib section channel positioned along at least one edge of the panel, the first strap section channel configured to receive a first portion of the strap section of the fastener strap, the at least one first stiffening rib section channel configured to receive the at least one first stiffening rib section of the fastener strap;

a component comprising a second strap section channel and at least one second stiffening rib section channel positioned along the second strap section channel, the second strap section channel and the at least one second stiffening rib section channel positioned along at least one edge of the component, the second strap section channel configured to receive a second portion of the strap section of the fastener strap, the at least one second stiffening rib section channel configured to receive the at least one second stiffening rib section of the fastener strap; and a second fastener strap installed on the panel and the component, the second fastener strap installed on opposite sides of the panel and the component as the fastener strap, wherein, when the fastener strap is installed in the first strap section channel, the at least one first stiffening rib section channel, the second strap section channel, and the at least one second stiffening rib section channel and when the second fastener strap is installed on the panel and the component, a load-bearing connection is formed between the panel and the component, wherein the component is a second panel.

9. The system of claim 8, wherein the at least one first stiffening rib section comprises two first stiffening rib sections with a first gap between the two first stiffening rib sections, wherein the at least one second stiffening rib section comprises two second stiffening rib sections with a second gap between the two second stiffening rib sections, wherein the first gap and the second gap are adjacently located along the fastener strap.

10. The system of claim 8, wherein the panel is an aircraft interior panel.

* * * * *